D. C. HINDS  1,725,982
BRAKE CONTROL MECHANISM
Filed April 14, 1927  2 Sheets-Sheet 1

Inventor
Daniel C. Hinds
George E. Mueller
Atty.

Aug. 27, 1929.   D. C. HINDS   1,725,982
BRAKE CONTROL MECHANISM
Filed April 14, 1927   2 Sheets-Sheet 2

Inventor
Daniel C. Hinds.
George E. Mueller Atty.

Patented Aug. 27, 1929.

1,725,982

UNITED STATES PATENT OFFICE.

DANIEL C. HINDS, OF SIOUX FALLS, SOUTH DAKOTA.

BRAKE-CONTROL MECHANISM.

Application filed April 14, 1927. Serial No. 183,660.

My invention relates in general to automobile control mechanisms, and more particularly to improved means for controlling an automobile brake.

The skilled automobile driver is well acquainted with certain shortcomings in the present type of clutch and brake control mechanism with which practically all automobiles are equipped. These shortcomings are more apparent at certain definite times, as for example when an automobile must be stopped and started on an up-grade, or when it is necessary to slow down and then start up again quickly, as for instance when crossing a fairly busy street intersection.

In the past a considerable number of combination brake and clutch mechanisms have been designed for the purpose of affording better control of the brake, but these combinations have been inadequate or objectionable for various reasons, principally perhaps, because they did not permit the normal operation of both the clutch and brake pedals, so that both the clutch and brake could be operated separately.

Among the objects of the present invention is to provide an improved brake control mechanism.

Another object is to provide a clutch and brake mechanism which may be controlled by the clutch pedal, but which will permit normal operation of each of these instrumentalities separately.

Other objects and advantages will appear from the consideration of the following detailed description taken with the accompanying drawings wherein—

Figure 3:
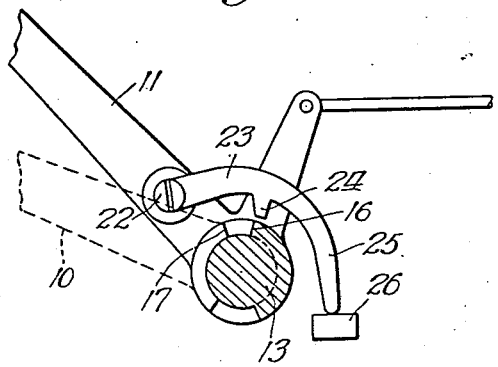

Fig. 3 indicates the position of the mechanism when the clutch pedal only is depressed.

Figure 4:
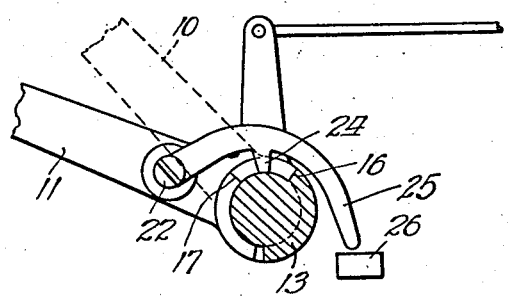

Fig. 4 shows the brake pedal only depressed.

Figure 5:
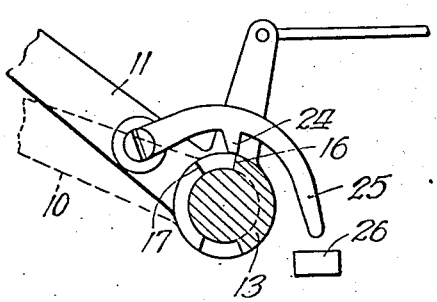
Figure 6:
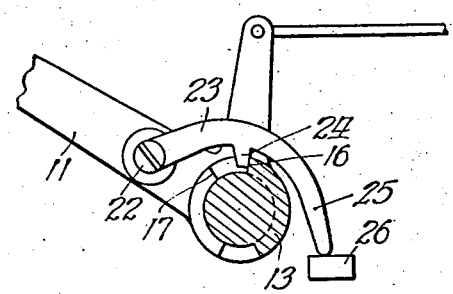

Fig. 5 shows the clutch pedal fully depressed, with the brake pedal partially depressed but not sufficiently to engage the clutch connection between the two pedals, and Fig. 6 illustrates the position of the parts when the clutch connection between the two pedals is engaged and the brake mechanism is controlled solely by the use of the clutch pedal.

In a control mechanism constructed according to my invention, both the clutch and the brake mechanisms are operable separately, each fully independent of the other. They are adapted to be joined together automatically however, so that both mechanisms may be controlled by the clutch pedal. The connection is made by controlling the position of the two pedals, and is released in the same way. When they are in engagement and the clutch pedal is fully released, the connection between the clutch and brake pedals is automatically broken.

Figure 1:
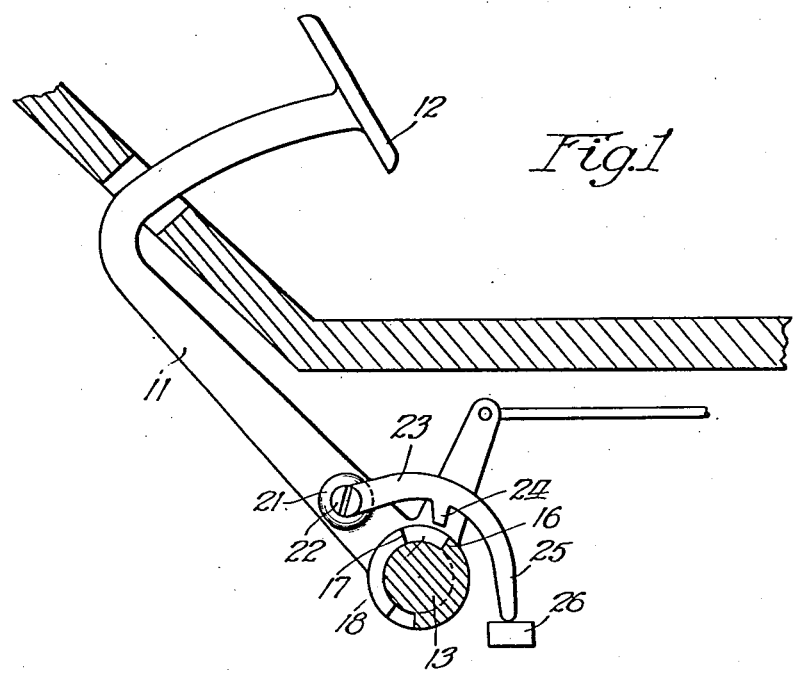
Fig. 1 is a longitudinal vertical sectional view of the mechanism such as would be taken on the line 1—1 of Fig. 2.
Figure 2:
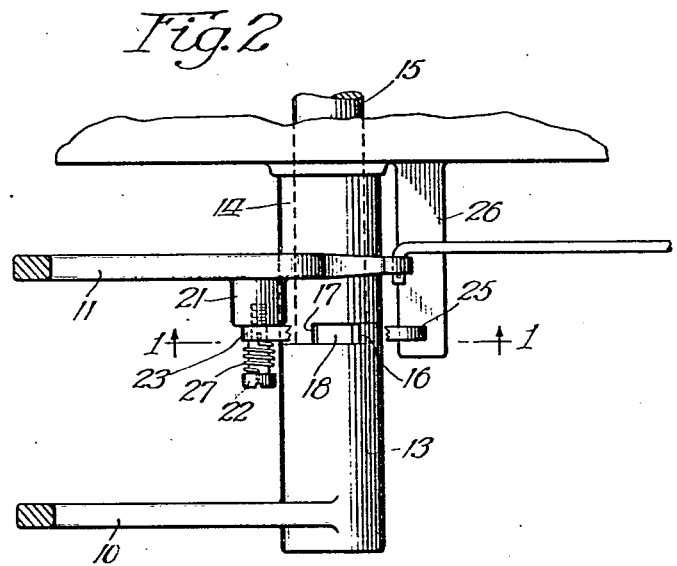
Fig. 2 is a fragmentary plan view of the mechanism.

The drawings showing one embodiment of the invention may now be referred to. The usual clutch and brake levers or pedals 10 and 11 are provided each with the usual foot piece 12, only that on the brake pedal appearing in the drawings (Fig. 1).

The clutch pedal has a hub 13 which is secured on a transverse shaft 15 connected to the automobile clutch. A hub 14 forms a pivot point for the brake lever, and is journaled on the clutch shaft 15. The adjacent faces of the two hubs are incised to form shoulders 16 and 17, separated by an open space 18.

A pawl 23 carried by the brake lever has a detent 24 adapted, on occasion, to engage the shoulder on the clutch pedal hub. The pawl is pivotally secured on a lug 21 on the inside face of the brake lever, by a cap screw 22, and a coil spring 27 serves to face the pawl in a direction to engage the shoulder with the pawl detent; but a tail piece 25 on the pawl engages a stop 26 and keeps the detent and shoulder out of engagement when the brake pedal is fully released.

It can be seen that if the detent 24 is brought into engagement with the shoulder 16 which moves with the clutch pedal, both the clutch and brake mechanisms may be operated by means of the clutch pedal. The detent is held out of engagement with the shoulder however when the brake pedal is fully released. This is because the tail portion 25 bears against the stop 26 and raises the entire pawl against the action of the pawl spring 27 so that the detent is entirely clear of the shoulder.

Before referring in detail to the manner in which the detent 24 is engaged by the shoulder on the clutch pedal, the manner in which the two pedals are adapted to operate should be borne in mind. (A) The clutch can be operated alone without touching the brake pedal. (B) The brake can be operated alone without interferring with the clutch pedal. (C) The brake and clutch mechanisms can be operated together by each one separately and directly by its own foot pedal. (D) Both the clutch and brake mechanisms may be controlled by the use of the clutch pedal alone, after the brake pedal is once operated.

When both the clutch and brake pedals are depressed, with the brake pedal sufficiently advanced for the detent 24 to drop into position in the opening 18, the foot may be removed from the brake pedal but the detent 24 will then hold the brake lever 11 off normal because said detent engages against the shoulder 16. The brake can then be operated to any further extent desired solely by further depression of the clutch pedal. To release the brake lever, the clutch lever is released sufficiently for the tail piece on the pawl to engage the stop and raise the detent out of engagement with the clutch shoulder. The brake pedal will then return immediately to its normal position.

Fig. 3 shows the clutch pedal depressed without the use of the brake. In this position the pawl is held upwardly by the engagement of its tail piece against the stop, and there is no opportunity for the clutch connection between the two pedals to operate.

In Fig. 4 the clutch pedal is unoperable and the brake pedal is depressed. In this position the pawl is released from engagement with the stop and the detent is extended down into the opening 18. It does not come into engagement with the shoulder 16 however, but simply rides along the periphery of the shaft 15. When the brake pedal is released, the pawl tail piece engages the stop and raises the detent out of the opening 18 before it has come into engagement with the shoulder on the clutch pedal.

Fig. 5 shows how to use the brake and clutch pedals separately without permitting them to become locked together. The clutch pedal is depressed a little farther than the brake pedal so that after the pawl tail piece is released from its stop, the detent rides on the hub of the clutch lever and is prevented from dropping down into engagement with the shoulder thereon. By simply keeping the pedals in this position, the clutch and brake mechanism may be operated separately. All that is necessary to effect the engagement between the two pedals, is to depress the brake mechanism as far or preferably a little farther than the clutch pedal. The detent will then ride off the hub on the clutch pedal and drop down into engagement with the shoulder thereon.

It is to be kept in mind, that with most automobile clutches, the first fractional portion of the downward travel of the clutch pedal releases the automobile clutch, and the remaining portion of its travel does not in any way affect the operation of the automobile clutch. This portion of the movement of the clutch pedal without effecting the operation of the automobile clutch is taken advantage of to control the clutch connection between my clutch and brake pedals.

For example, if I wish to use both of these mechanisms separately, I depress the clutch pedal as far as possible and I will then be free to work the brake pedal, since the brake pedal starts to take effect immediately and only a partial depression thereof is necessary to obtain all the braking action required. If however, I wish to operate the two pedals together, I depress the clutch pedal only partially, but still sufficiently to release the automobile clutch. I then depress the brake pedal slightly more than the clutch pedal and then release the same. After the brake pedal starts to return to its normal condition, the detent carried thereby will engage the shoulder on the clutch pedal and arrest the motion of the brake pedal. I may now apply the brake with various pressures solely by the use of the clutch pedal, the automobile clutch during this time being released.

I place the stop 26 in such a position that the brake will be entirely released at the moment that the automobile clutch begins to engage. The desirability of this feature is apparent. I may stop on an up-grade and operate both the clutch and brake mechanisms by means of the clutch pedal alone, while the right foot is free to operate the foot throttle or accelerator pedal. Any person who has started an automobile while standing on an up-grade can appreciate the advantage of this arrangement. Instead of attempting to operate both the hand emergency brake and gear shift lever with one hand, (or to operate the foot brake and use the hand throttle while shifting gears with the right hand), I am enabled to operate both the clutch and brake mechanisms with the left foot, using the right foot on the accelerator pedal and still have the right hand entirely free for operating the gear shift lever.

Another place where my invention is of particular value, is when approaching a cross road, or other place where it is necessary to slow up without coming to a full stop. I operate the brake mechanism with the clutch pedal, while still keeping the right foot on the accelerator pedal. When I wish to release the brake and again start the automobile forward at an increased rate of speed, my right foot is already on the accelerator pedal, so that I thus immediately accelerate the motor so that the speed of the drive shaft and motor will be synchronized. I am then in position immediately to give slightly more fuel to the automobile by means of the accelerator pedal to further increase the speed thereof.

My invention is also of utility when a motor is cold or when the carburetor thereof is poorly adjusted, making it run poorly and apt to "stall" at idling speeds. Instead of operating the hand throttle to prevent stalling in such an instance, I can operate the brake by means of the clutch pedal and feed slightly increased amounts of fuel to the motor from time to time by means of the accelerator pedal, to prevent stopping thereof.

It is obvious that there are many ways in which the principles of my invention can be carried out without departing from the spirit and scope thereof. For this reason, I do not restrict myself in any way in the embodiment herein shown and described but what I claim as new and desire to protect by Letters Patent of the United States is as follows:

What I claim as new and desire to secure by United States Letters Patent is:

1. The combination of an automobile with a clutch and brake mechanism each operated with a separate foot pedal, and each capable of being controlled independently of the other, of means for automatically temporarily connecting the brake mechanism to the clutch pedal when operated so that both clutch and brake mechanism may be thereafter operated by one of the foot pedals.

2. The combination of an automobile with a clutch and brake mechanism each operated with a separate foot pedal, and each capable of being controlled independently of the other, of means for automatically temporarily connecting the brake mechanism to the clutch pedal when operated so that both clutch and brake mechanism may be thereafter operated by one of the foot pedals, and means for automatically disconnecting the brake pedal from the clutch pedal when the clutch pedal is released to engage the clutch.

3. The combination of an automobile with a clutch and brake mechanism each operated with a separate foot pedal, and each capable of being controlled independently of the other, of means for automatically temporarily connecting the brake mechanism to the clutch pedal when operated so that both clutch and brake mechanism may be thereafter operated by one of the foot pedals, and means for forming the connection between the brake mechanism and clutch pedal through the manipulation of the foot pedals, and means for disconnecting the brake mechanism from the clutch pedal solely through manipulation of such pedals.

4. The combination of an automobile with a clutch and brake mechanism each operated with a separate foot pedal, and each capable of being controlled independently of the other, of means for automatically temporarily connecting the brake mechanism to the clutch pedal when operated so that both clutch and brake mechanism may be thereafter operated by one of the foot pedals, and means controlled by the degree of depression of the brake pedal with respect to the degree of depression of the clutch pedal for connecting the brake mechanism to the clutch pedal.

5. In an automobile equipped with clutch and brake mechanism, a pair of pivotally supported foot pedals connected separately to the clutch and brake mechanism respectively and normally operable independently of each other, a clutch adapted to connect the two pedals together, and mechanism for preventing the engagement of the clutch except when the two pedals are in a predetermined relation.

6. In an automobile equipped with clutch and brake mechanism, a pivotally supported clutch pedal having a hub portion at the pivot with a shoulder thereon, a brake pedal pivotally supported adjacent said clutch pedal, a detent carried by the brake pedal adapted to be engaged by said shoulder, and mechanism for normally preventing engagement between said shoulder and said detent.

7. In an automobile equipped with clutch and brake mechanism, a pivotally supported clutch pedal having a shoulder thereon, a brake pedal pivotally supported adjacent said clutch pedal, a detent carried by the brake pedal adapted to be engaged by the shoulder on the clutch pedal, and a stop to hold the detent away from the shoulder when the brake pedal is in released position.

8. The combination defined in claim 4 wherein the detent is adapted to ride upon a portion of the clutch pedal to prevent engagement between the shoulder and said detent, until the brake pedal has been depressed slightly in advance of said clutch pedal.

9. The combination defined in claim 4 wherein said detent is spring pressed in a direction so as to engage said shoulder.

10. In an automobile equipped with clutch and brake mechanism and clutch and brake pedals for operating the clutch and brake mechanisms independently of each other, means for interconnecting the two mechanisms to operate the same together by means of a single pedal, means for preventing the connection when the pedals are in normal position, and means for forming the connection when both pedals are depressed, with the clutch pedal depressed in advance of the brake pedal.

11. In an automobile equipped with clutch and brake mechanism, a pivotally supported clutch pedal, a pivotally supported brake pedal adjacent thereto, a connection clutch between the two pedals for securing them together, and means for causing the engagement of said clutch when the two pedals are depressed to an off normal position so that both automobile clutch and brake mechanism may be controlled by the clutch pedal alone.

12. In an automobile equipped with clutch and brake mechanism, a clutch pedal, a brake pedal adjacent thereto, a connecting clutch between the two pedals for securing them together, means for engaging said clutch when the two pedals are depressed to an off normal position so that the automobile clutch and brake mechanism may be controlled by the clutch pedal alone, and means for automatically disengaging said connecting clutch between the pedals when the automobile clutch pedal is released.

In witness whereof, I hereunto subscribe my name this 22nd day of January A. D. 1927.

DANIEL C. HINDS.